(12) United States Patent
Jeon

(10) Patent No.: US 7,378,801 B2
(45) Date of Patent: May 27, 2008

(54) DRIVING CIRCUIT FOR INVERTER

(75) Inventor: Jin-Hwan Jeon, Suwon-si (KR)

(73) Assignee: LG. Philips LCD Co., Ltd., Seoul (KR)

( * ) Notice: Subject to any disclaimer, the term of this patent is extended or adjusted under 35 U.S.C. 154(b) by 233 days.

(21) Appl. No.: 11/166,310

(22) Filed: Jun. 24, 2005

(65) Prior Publication Data

US 2006/0145630 A1    Jul. 6, 2006

(30) Foreign Application Priority Data

Dec. 30, 2004    (KR) ............... 10-2004-0116314

(51) Int. Cl.
*H05B 39/04* (2006.01)
(52) U.S. Cl. .................................. 315/209 R
(58) Field of Classification Search ............ 315/224, 315/226, 308, 209 R, 291, 307, DIG. 7; 363/17, 363/98, 132, 21.12
See application file for complete search history.

(56) References Cited

U.S. PATENT DOCUMENTS

| | | | |
|---|---|---|---|
| 5,548,189 A * | 8/1996 | Williams | 315/224 |
| 6,121,732 A * | 9/2000 | Parker et al. | 315/209 R |
| 6,239,558 B1 | 5/2001 | Fujimura et al. | |
| 6,396,722 B2 * | 5/2002 | Lin | 363/98 |
| 6,804,129 B2 * | 10/2004 | Lin | 363/98 |
| 2004/0145584 A1 * | 7/2004 | Lee et al. | 345/212 |
| 2004/0207339 A1 | 10/2004 | Lin et al. | |
| 2006/0017403 A1 * | 1/2006 | Matsushima | 315/291 |

FOREIGN PATENT DOCUMENTS

| | | |
|---|---|---|
| DE | 198 53 657 A1 | 5/2002 |
| JP | 08-45679 | 2/1996 |
| JP | 09-93959 | 4/1997 |
| JP | 09-233851 | 9/1997 |
| JP | 10-108479 | 4/1998 |
| JP | 2000-324849 | 11/2000 |

OTHER PUBLICATIONS

German Office Action dated Jan. 22, 2008.
Examiner's Office Letter dated Jan. 23, 2008.

* cited by examiner

*Primary Examiner*—Douglas W. Owens
*Assistant Examiner*—Minh Dieu A
(74) *Attorney, Agent, or Firm*—Brinks Hofer Gilson & Lione

(57) ABSTRACT

A driving circuit for an inverter, including a rectification/smoothing unit rectifying and smoothing a first AC voltage to generate a DC voltage, and a DC/AC inverter inverting the DC voltage from the rectification/smoothing unit to a second AC voltage higher than the first AC voltage.

9 Claims, 1 Drawing Sheet

DRIVING CIRCUIT FOR INVERTER

This application claims the benefit of Korean Patent Application No. 2004-0116314, filed in Korea on Dec. 30, 2004, which is hereby incorporated by reference for all purposes as if fully set forth herein.

TECHNICAL FIELD

The present application relates to a driving circuit for inverter, and more particularly, to an inverter driving circuit with low power consumption.

BACKGROUND

A liquid crystal display device is fabricated such that an upper substrate and a lower substrate are attached facing each other, and a liquid crystal layer is disposed between the upper substrate and the lower substrate. A color filter layer transmitting a light of a specific wave length and a common electrode producing an electric field are formed on the upper substrate. Gate and data lines crossing each other, a thin film transistor for a switching element, and a pixel electrode for producing an electric field are formed on the lower substrate. The liquid crystal display device operates by using an optical anisotropy and a polarization property of liquid crystal molecules. The liquid crystal molecules have a molecular arrangement direction, and thus the direction is controlled by supplying an electric field to the liquid crystal molecules. That is, the arrangement direction of the liquid crystal molecules is changed by supplying an electric field to the liquid crystal molecules with by switching the thin film transistor, and thus a transmittance of the light is controlled. The light passing through the liquid crystal molecules passes through the color filter, and thus the liquid crystal display device displays images.

The liquid crystal display device is a non-emissive type display device using a light source. For example, a cold cathode fluorescent lamp (CCFL) is used as a light source, and the lamp is driven by an inverter. The CCFL of the liquid crystal display device can be driven with an alternating current (AC) voltage of approximately 840V.

As shown in FIG. 1, the driving circuit for inverter 100 is partitioned into a rectification/smoothing unit, a direct current/direct current converter (DC/DC converter), and a direct current/alternating current inverter (DC/AC inverter). When an AC 220V is inputted, the rectification/smoothing unit with a bridge rectifier 110 rectifies and smoothes the AC 220V to generate a DC 311V. When a power factor correction (PFC) function by a power saving circuit (not shown) is used in order to improve a power efficiency, the AC 220V may be rectified and smoothed to be a DC 400V. Accordingly, the AC 220V inputted to the rectification/smoothing unit may be rectified and smoothed to the DC 311 V or 400V. Then, the DC 311 V or 400V is changed to a DC 12V to 24V through the DC/DC converter with a switching mode power supply transformer (SMPS transformer) 120, and then inputted to the DC/AC inverter. Then, the DC 12V to 24V are changed to an AC 840V for driving a lamp 140 through the DC/AC inverter with a transformer 130, thereby driving the lamp 140. The transformer 130 is generally a magnetic transformer.

A ground of the driving circuit for inverter 100 is divided into a hot ground and a cold ground by the SMPS transformer 120. In general, the cold ground may be referred to as an earth. The hot ground is a ground for the DC voltage rectified and smoothed from the AC voltage, and may inflict a bodily injury on a person. A voltage difference between the hot ground and the cold ground may be about 100V.

The driving circuit for inverter according to the related art has two transformation stages through the two transformers 120 and 130, and power is consumed through each stage. More particularly, the efficiency through the rectification/smoothing unit is 95%, the efficiency through the DC/DC converter is 90%, and the efficiency through the DC/AC inverter is 76.4%.

SUMMARY

A driving circuit for inverter with low power consumption is described.

A driving circuit for inverter includes a rectification/smoothing unit rectifying cating and smoothing a input AC voltage to generate a DC voltage; and a DC/AC inverter inverting the DC voltage from the rectification/smoothing unit to a second AC voltage higher than the first AC voltage.

DETAILED DESCRIPTION

Exemplary embodiments may be better understood with reference to the drawings, but these embodiments are not intended to be of a limiting nature.

Figure 1:
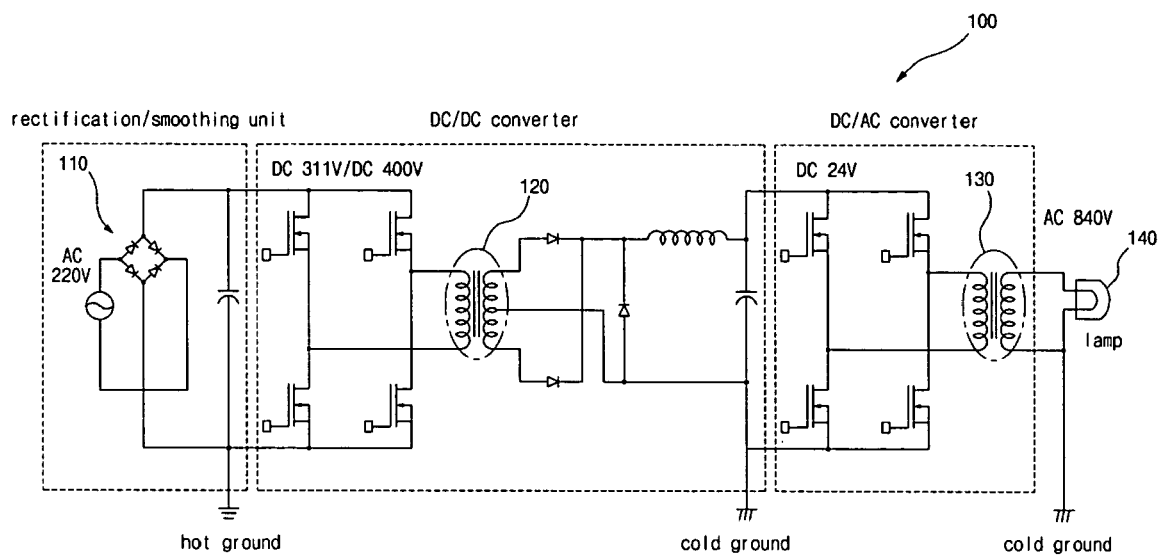
FIG. 1 is a view illustrating a driving circuit for inverter according to the related art.
Figure 2:
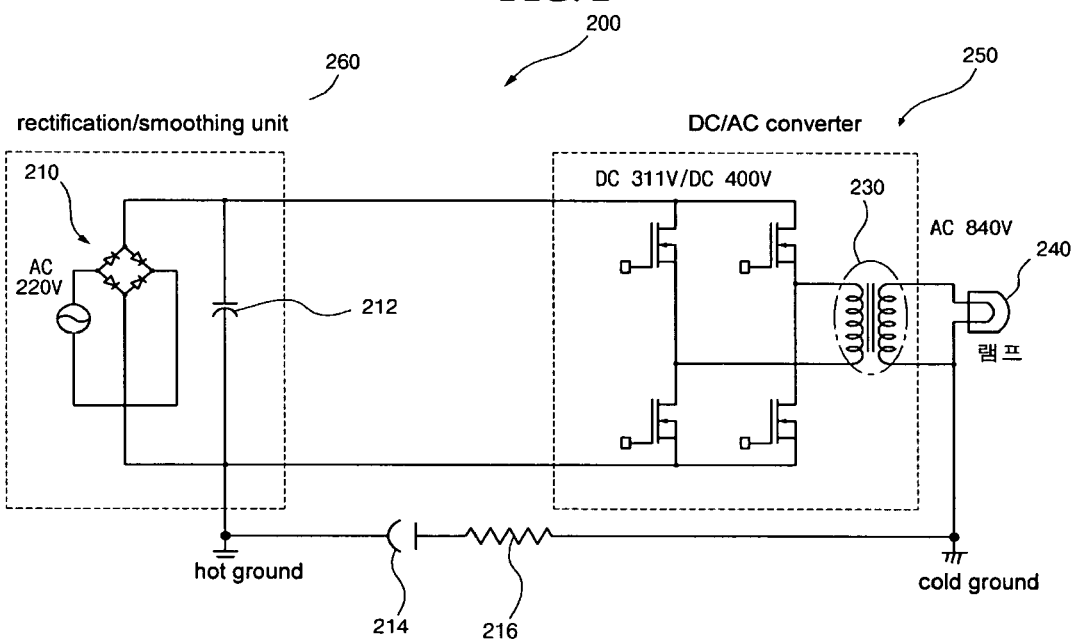
FIG. 2 is a view illustrating a driving circuit for inverter according to an embodiment.

As shown in FIG. 2, the driving circuit for inverter 200 is partitioned into a rectification/smoothing unit 260 and a DC/AC inverter 250. The rectification/smoothing unit 260 has a bridge rectifier 210 using a diode, and the DC/AC inverter 250 has a transformer 230. When an AC 220V is input, the rectification/smoothing unit rectifies and smoothes the AC 220V using capacitor 212 to generate a DC 311 V. When a power factor correction (PFC) function by a power saving circuit (not shown) is used in order to improve a power efficiency, the AC 220V may be rectified and smoothed to be a DC 400V. Accordingly, the AC 220V input to the rectification/smoothing unit 260 may be rectified and smoothed to the DC 311V or 400V. Then, the DC voltage is input directly to the DC/AC inverter 250. As a result, the DC 311V or 400V is changed to an AC 840V for driving a lamp 240 through the DC/AC inverter 250, thereby driving the lamp 240.

The description is based on the use of an approximately 220 VAC input voltage as may found in power systems in countries other than the United States, however it will be understood by those skilled in the art that an input voltage of approximately 115 VAC may used as the basis of the design. In such a circumstance, the voltage at the output of the rectification/smoothing unit 260 would be reduced proportionately to the input voltage reduction, and the voltage increase in the DC/AC inverter increased accordingly to achieve the required output voltage.

A ground of the driving circuit for inverter 200 is divided into a hot ground and a cold ground by the transformer 230 of the DC/AC inverter. The cold ground may be referred to as an earth. The hot ground is a ground for the rectified DC voltage rectified and smoothed from the AC voltage, and may inflict a bodily injury on a person. A voltage difference between the hot ground and the cold ground may be about 100V. The voltage difference between the hot ground and the cold ground should be reduced to drive the driving circuit for inverter 200 smoothly. To do this, the hot ground and the cold ground may be coupled by using a capacitor 214 and a resistor 216. As a result, the driving circuit for inverter according to the embodiment of the present invention may be driven with one stage, and thus power consumption is reduced.

Further, the transformer 230, according to the embodiment, is a piezoelectric transformer, which has a higher efficiency and less loss than a magnetic transformer. Accordingly, an input voltage of the DC/AC inverter is increased, and the efficiency is improved. A voltage of more than approximately AC 840V is required in order to drive the lamp 240. Since the DC 311 V or 400V obtained through the rectification/smoothing unit is input to the DC/AC inverter, the piezoelectric transformer 230 may be utilized without a booster transformer. Accordingly, the lamp 240 of the driving circuit for inverter according to the embodiment is driven through the rectification/smoothing unit having an efficiency of 95% and the DC/AC inverter having an efficiency of 85%, by using the piezoelectric transformer 230. Thus, the efficiency is improved by about 15%.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. A driving circuit for an inverter, comprising:
    a rectification/smoothing unit rectifying and smoothing a first AC voltage to generate a DC voltage;
    a DC/AC inverter inverting the DC voltage from the rectification/smoothing unit to a second AC voltage higher than the first AC voltage, the DC/AC inverter including a transformer; and
    first and second grounds disposed on an input side and an output side of the transformer, respectively, wherein the first and second grounds are coupled by using a capacitor and a resistor, and the second ground is directly connected to the resistor.

2. The driving circuit according to claim 1, wherein the rectification/smoothing unit further includes a bridge rectifier.

3. The driving circuit according to claim 1, wherein the transformer is a piezoelectric transformer.

4. The driving circuit according to claim 1, wherein the second ground is a ground for the AC voltage, and the first ground is a ground for the DC voltage.

5. The driving circuit according to claim 1, wherein the first AC voltage is approximately 220V, the DC voltage is approximately 311V or 400V, and the second AC voltage is approximately 840V.

6. The driving circuit according to claim 1, wherein the first AC voltage is approximately 110V, the DC voltage is approximately 155V or 200V, and the second AC voltage is approximately 840V.

7. A display device, comprising:
    a liquid crystal display device;
    a lamp;
    a lamp driving circuit, including a rectifier and a direct-current-to-alternating-current (DC/AC) inverter, the DC/AC inverter including a transformer; and
    first and second grounds disposed on an input side and an output side of the transformer, respectively, wherein the first and second grounds are coupled by using a capacitor and a resistor, and the second ground is directly connected to the resistor,
    wherein an output voltage of the DC/AC inverter is greater than an input voltage to the rectifier.

8. The driving circuit according to claim 7, wherein the transformer is a piezoelectric transformer.

9. The driving circuit according to claim 7, wherein the second ground is a ground for the AC voltage, and the first ground is a ground for the DC voltage.

* * * * *